UNITED STATES PATENT OFFICE.

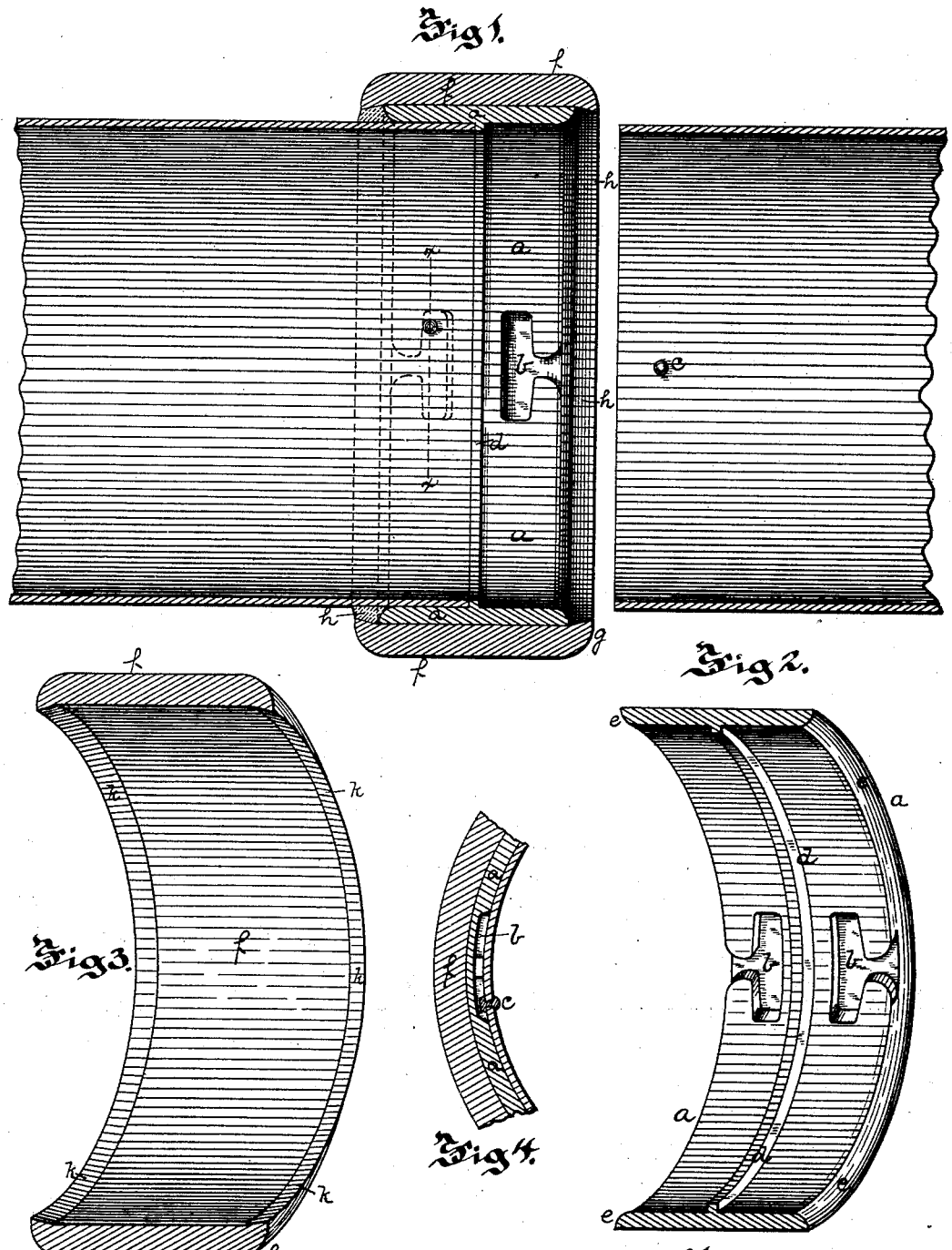

EDMUND C. CONVERSE, OF PITTSBURG, PENNSYLVANIA.

JOINT FOR GAS-MAINS.

SPECIFICATION forming part of Letters Patent No. 362,205, dated May 3, 1887.

Application filed February 6, 1886. Serial No. 191,019. (No model.)

*To all whom it may concern:*

Be it known that I, EDMUND C. CONVERSE, of Pittsburg, in the county of Allegheny and State of Pennsylvania, have invented a new and useful Improvement in Joints for Gas-Mains; and I do hereby declare the following to be a full, clear, and exact description thereof.

My invention relates to the joints employed in connecting the sections of pipe or tubing employed as mains or conduits for natural gas or similar gaseous material. This gas is exceedingly thin and subtle, and great difficulty has been experienced in providing a perfect joint for the sections of tubing forming the mains or conduits through which it passes, as it is liable to leak between the threads of the ordinary threaded tubing, and it has been practically demonstrated that the ordinary threaded sockets cannot always be made sufficiently tight for holding this gas in large mains or pipes. After large experience in the laying of these gas-mains it has been found that the lock-joint couplings for tubing—such as are shown in Letters Patent No. 263,863, granted to me September 5, 1882, and similar couplings patented by me, in which the pipe is held from longitudinal strain, and means are provided for calking the tubing and forming tight joints after the line is laid—give better results for large pipe or tubing than any other construction of joint heretofore employed, and also have the further advantage that, as the pipe is not weakened by threading, a lighter and cheaper pipe may be employed. Considerable difficulty has, however, been experienced with these joints (when employed on high-pressure natural gas mains near the gas wells) on account of the porosity of the cast-iron of which these sleeves or collars have been made, this not being the fault of the joint, but of the materials of which it is formed, as it is found that under very heavy pressure the natural gas will leak through the pores of the cast metal, and even though the cast-metal sleeve does in most cases form a tight joint at a moderately high pressure, yet at a very heavy pressure—such as from one hundred and fifty to two hundred pounds—the leakage of the gas when it occurs through the pores of the cast-metal is perceptible when the hand is placed close thereto, and therefore the ordinary cast-metal coupling-collar is not quite perfect for mains carrying this gas under very heavy pressure. For this reason it is desirable to obtain a perfect joint of this character, in which there is no liability of the gas leaking through the pores of the metal; and the object my of invention is to so improve the class of couplings above referred to as to overcome these objections to them, and to preclude the leaking of the gas through the pores of the metal of which the coupling is formed.

To this end it consists, generally, in a coupling sleeve or collar having a cast-iron inner shell provided with locking-recesses for engaging with the tube-sections, and an outer wrought-metal shell secured around the inner shell and extending beyond the ends thereof to form annular calking-recesses at the ends of the combined sleeve, the inner cast-metal shell being entirely inclosed within the outer shell and the calking material when the coupling is in use, and the dense texture of the outer wrought-metal shell precluding leakage through the same, while the calking material precludes leakage at the ends of the coupling.

It also consists in such coupling sleeve having the inner shell first cast to shape and the outer wrought-metal shell shrunken around it, the outer shell binding upon the inner shell and forming a strong union between them.

To enable others skilled in the art to make and use my invention, I will describe its construction and manner of use, referring to the accompanying drawings, in which—

Figure 1 is a longitudinal central section of this coupling sleeve or collar, showing one tube connected therein and the other tube in position to enter and engage therewith. Fig. 2 is a sectional perspective view of the inner shell. Fig. 3 is a like view of the outer shell; and Fig. 4 is a cross-section on the line *x x*, Fig. 1, of a detached portion of the coupling and tube connected thereto.

Like letters of reference indicate like parts in each.

In forming my improved coupling the inner shell, *a*, is first cast to shape, being formed of cast metal in the ordinary manner, and having therein suitable locking-recesses, *b*, or other devices for engaging with the sections of tubing to be connected, the form of locking device preferred by me being the recesses $b$ in the shell, with which the lugs or rivets $c$ on the tube-section engage, though other forms of locking or engaging devices, by means of which the inner shell and the section of tubing can be connected, may be employed. The shell has preferably the inner central ring, $d$, against which the ends of the tube-sections butt or bear, so forming a smooth interior within the joint, and the ends of this inner shell are preferably formed beveled, as shown at $e$, to direct the tube to place as it enters the coupling-sleeve. This inner shell, $a$, is made somewhat shorter than the finished coupling-sleeve, and over the inner shell fits the outer shell, $f$, which is made of wrought metal, being forged to shape in any suitable manner, and being of sufficient length to extend beyond the inner shell, $a$, at each end of the finished collar, as at $g$, so as to form the calking-recess $h$ at the end of the finished collars and beyond the inner shell, $a$. The ends of the outer shell, $f$, are preferably formed inwardly flaring or inclined, as shown at $k$, so that when fitting over the inner shell they form the inwardly-flaring annular calking-recesses, by means of which the lead or other calking material employed will be held to place after the joint is formed. Where the two shells are formed separately and then connected, the outer face of the inner cast-metal shell, $a$, and the interior of the outer wrought-metal shell, $f$, are formed accurately, so that when the outer shell is heated and expanded it can be placed over the inner shell, and upon cooling will contract and shrink upon the same, thus forming a solid combined cast-metal and wrought-metal coupling sleeve or collar, which can be employed in the same manner as the coupling sleeve or collar shown in the patent granted to me, as above referred to.

In forming the joint the pipe-sections are inserted within the coupling-sleeve and engage with the recesses $b$, or other suitable connections, in the inner shell of the coupling-sleeve by means of the lugs $c$ thereon, or other suitable device, and the lead or other calking material is then poured into the calking-recess $h$ and calked in the ordinary manner, thus forming the joint. The inner shell is thus entirely inclosed by the outer shell, formed of dense wrought metal, and the calking material at the ends inclosed between the wrought-metal shell and the body of the tube-sections, and the gas in passing through the coupling, though it may leak between the ends of the tube-sections and the inner central ring and between the interior of the cast-metal body and the exterior of the tube-section, is prevented from escaping by means of the lead or other suitable calking material within the calking-recesses at the ends of the collar, and even though the inner shell may be porous, so that the gas under very heavy pressure might leak through the same, yet the outer wrought-metal shell fitting over the inner cast-metal shell is of such density that it will prevent the escape of gas, the texture of wrought metal being close and fine, so precluding the escape of gas, and in case the gas should leak through the body of the inner shell it could only pass along until it came against the calking material at the ends of the coupling-collar, by which it would be prevented from escape. It is therefore evident that by my improved coupling-collar I am enabled to provide a practically-perfect joint for gas-mains, through which there is no liability whatever of gas escaping, as the texture of the outer sleeve is so close and fine that it will prevent all escape of gas, and the only objection to my patent for high gas or air pressures is thus overcome.

The cost of my improved coupling is but little above that of the ordinary cast-metal collar, as the amount of cast metal employed is reduced, and after the ordinary forging of the outer shell there is but little work required thereon.

I am aware that a sleeve has been slipped over an ordinary wrought-metal threaded coupling to form calking-recesses at the ends thereof. This sleeve was not, however, secured to the coupling, and performed no other function than to form calking-recesses, as there was not the difficulty of the porosity of the inner shell found in the class of couplings to which my invention relates.

What I claim as my invention, and desire to secure by Letters Patent, is—

1. In joints for gas and similar mains, the combination of the cast-metal inner shell provided with locking-recesses for engaging with the tube-sections, and the outer wrought-metal shell secured around and extending beyond the inner shell to form calking-recesses, substantially as and for the purposes set forth.

2. In joints for gas and similar mains, the combination of a cast-metal inner shell provided with locking-recesses for engaging with the tube-sections, and an outer wrought-metal shell fitting around and shrunken upon the inner shell and extending beyond the same to form calking-recesses, substantially as and for the purposes set forth.

3. In joints for gas and similar mains, the combination of the inner cast-metal shell having the locking-recesses $b$, for engaging with the tube-sections and the beveled ends $e$, and the outer wrought-metal shell fitting around the inner shell and having the inwardly-flaring portions $k$, extending beyond the same, substantially as and for the purposes set forth.

In testimony whereof I, the said EDMUND C. CONVERSE, have hereunto set my hand.

EDMUND C. CONVERSE.

Witnesses:
  JAMES I. KAY,
  J. N. COOKE.